UNITED STATES PATENT OFFICE.

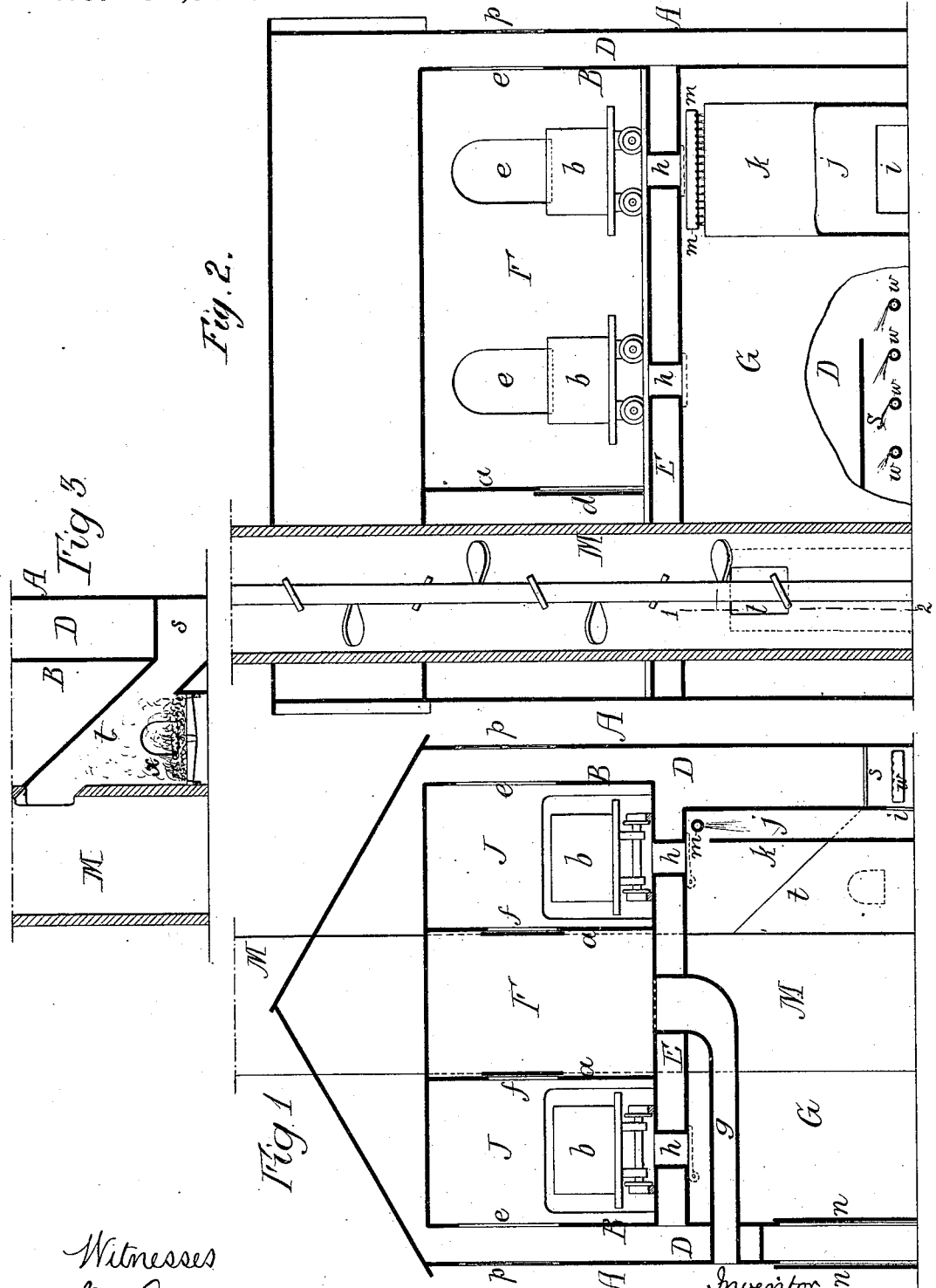

ADAM W. LOUTH, OF PHILADELPHIA, PENNSYLVANIA.

DEODORIZING NOXIOUS GASES.

SPECIFICATION forming part of Letters Patent No. 234,793, dated November 23, 1880.

Application filed January 12, 1880.

*To all whom it may concern:*

Be it known that I, ADAM W. LOUTH, a citizen of the United States, residing in Philadelphia, Pennsylvania, have invented an Improvement in Deodorizing Buildings, of which the following is a specification.

My invention relates to certain improvements in the building for which Letters Patent of the United States No. 192,441 were granted to me on the 26th day of June, 1877, the object of my present improvements being to effect the thorough deodorizing of the noxious gases before the latter are allowed to escape through the chimney.

In the accompanying drawings, Figure 1 represents a transverse section of a building constructed according to my invention; Fig. 2, a longitudinal section of the same; and Fig. 3, a transverse section on the line 1 2, Fig. 2.

A is the outer wall, and B the inner wall, of the building, the two walls inclosing a space, D, as in the building shown in my former patent.

The interior of the building is divided by a hollow partition, E, with two apartments, F and G, the upper apartment, F, being subdivided by partitions $a\ a$ into chambers J J, between and at the ends of which are suitable passages for the workmen. The floors of the chambers J J are furnished with rails, to which are adapted trucks carrying tanks $b$, said trucks and tanks being introduced into or removed from the chambers J through end openings provided with suitable doors $d$. The chambers J communicate with the space D through openings $e$ in the inner wall, B, said chambers also communicating with the room F through openings $f$ in the partitions $a$, through which openings the materials to be mixed in the tanks $b$ may be introduced into said tanks. External air is admitted to the apartment F through a duct, $g$.

Passages $h$ in the hollow partition F connect the chambers J and the lower apartment, G, so that when the material has been properly mixed in the tanks $b$ it may be discharged therefrom in any suitable manner through the passages $h$ into the said apartment G, where the drying of the mass may be effected. The passages $h$ should be provided with self-closing valves to prevent the gases in the apartment G from rising into the chambers J.

The apartment G communicates with the space D through an opening, $i$, in the inner wall, B, the gases generated in said room G being compelled to pass through a passage, $j$, inclosed by a casing, $k$, before reaching said opening $i$. Above the open top of the casing $k$ is a perforated pipe, $m$, to which water is admitted, and from which said water escapes in a series of jets or sprays, which descend through the passage $j$, thereby inducing a flow of gases through the same and serving to aid in the disinfecting of said gases.

Access to the room or apartment G may be had through a doorway provided with double doors $n\ n$, as shown in Fig. 1.

The outer wall, A, of the building has openings provided with window-sashes $p$, said openings, by preference, being arranged opposite or adjacent to the openings in the inner wall, B, so as to provide for the proper lighting of the interior of the building.

The space D communicates with the chimney M through a passage, $s$, and outlet-flue $t$, located at the bottom of the space D on one side of the building, perforated pipes $w$ being arranged in the passage $s$, and a furnace, $x$, being located in the flue $t$.

The draft of the chimney is such that a partial vacuum is produced in the space D, the natural draft being assisted, if necessary, by a vaned shaft, such as shown in Fig. 2, or by any other equivalent device arranged in or communicating with the chimney.

The noxious gases generated in the chambers J or apartment G are thus drawn into the space D, the gases from the apartment G being subjected to a preliminary washing and disinfecting operation in their passage, as above set forth.

In order to escape from the space D the gases must first be drawn through the passage $s$, and then through the flue $t$. In the passage $s$ the gases are subjected to the action of the sprays of water from the pipes $w$, and in the flue $t$ said gases are acted upon by the products of combustion from the furnace $x$.

By these means the gases are thoroughly disinfected before being allowed to enter the chimney M, from which they escape in an odorless condition.

The sprays of water to which the gases are subjected, in addition to their disinfecting duty, aid the chimney-draft in inducing a proper circulation of the gases.

The number and arrangement of the apartments in the building may be modified as circumstances may suggest. For instance, the chambers J may be subdivided into smaller chambers, one for each tank $b$, and the apartment G may be subdivided into a number of chambers corresponding to the chambers J above, each of the subdivisions, in such case, having an outlet with passage $f$, casing $k$, and spraying-pipe $m$.

I claim as my invention—

1. The combination of a chimney, a building having double walls inclosing a chamber, D, communicating freely with the rooms or apartments in the building, a passage, $s$, connecting the lower portion of said chamber D with the lower end of the chimney, and a water-spraying device arranged in said passage, as set forth.

2. The combination of the chimney, the building having double walls inclosing a space, D, communicating with the chimney and with the interior of the building, the passage $s$, the flue $t$, and the perforated pipes $w$, as set forth.

3. The combination of the wall of an apartment having an outlet, $i$, and the casing $k$, surrounding said outlet and inclosing a passage, $j$, with a pipe, $m$, located in the upper part of said passage, as described, whereby sprays of water are directed into and through the said passage, as specified.

In testimony whereof I have signed my name to this specification in the presence of two subscribing witnesses.

ADAM W. LOUTH.

Witnesses:
ALEXANDER PATTERSON,
HARRY SMITH.